Figure 1:
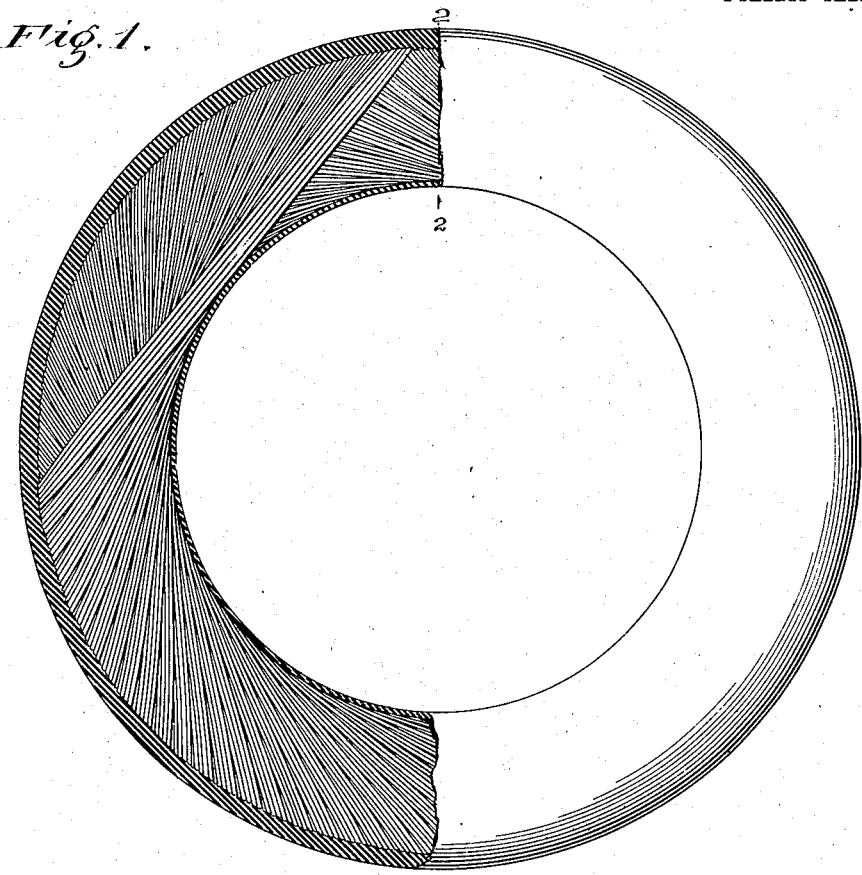

J. F. PALMER.
TIRE CASING.
APPLICATION FILED OCT. 12, 1905.

924,571.

Patented June 8, 1909.
2 SHEETS—SHEET 1.

Witnesses:
K. M. Cornwall
J. E. Sherrey.

Inventor:
John F. Palmer,
by Ritter, Wiles & Shurrey
Attys

J. F. PALMER.
TIRE CASING.
APPLICATION FILED OCT. 12, 1905.
924,571.
Patented June 8, 1909.
2 SHEETS—SHEET 2.
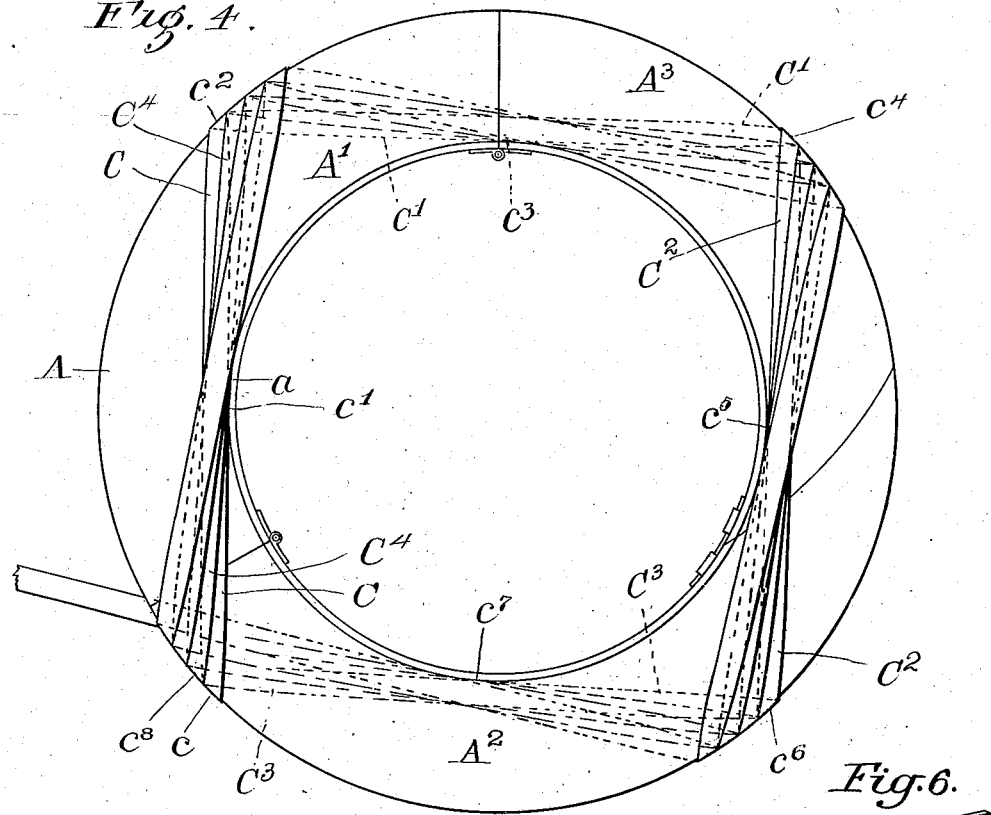
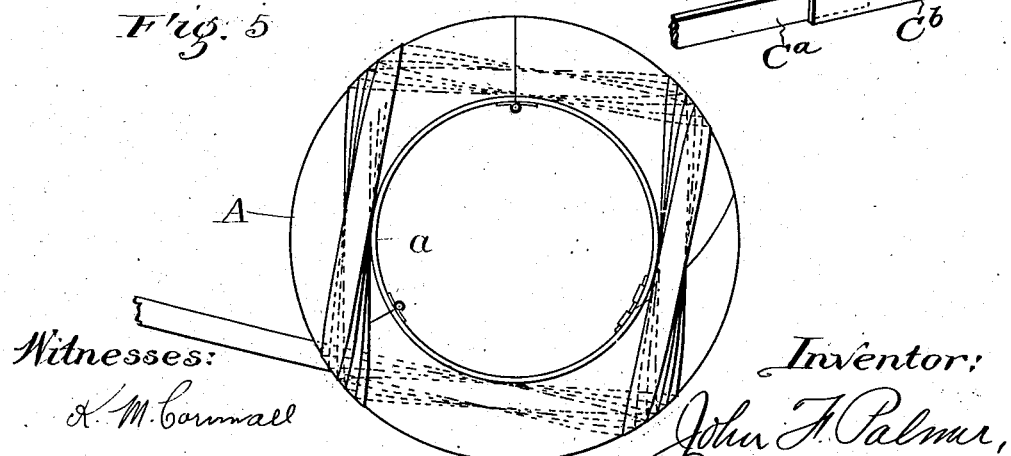

UNITED STATES PATENT OFFICE.

JOHN F. PALMER, OF CHICAGO, ILLINOIS.

TIRE-CASING.

No. 924,571.  Specification of Letters Patent.  Patented June 8, 1909.

Application filed October 12, 1905. Serial No. 282,373.

*To all whom it may concern:*

Be it known that I, JOHN F. PALMER, a citizen of the United States of America, residing at Chicago, in the county of Cook and State of Illinois, have invented certain new and useful Improvements in Tire-Casings, of which the following is a specification.

My invention relates to improvements in pneumatic tires, and more particularly to improvements in that type of pneumatic tire having an outer removable casing which is open on the inner or rim side to receive an inner tube, and which can be bodily removed from the rim when desired. In other words, the improvements are in the type of tire, commonly known as the "detachable" tire.

The object of my invention is to provide for such tires an outer casing having certain desirable qualities hereinafter set forth, and which can be constructed at a comparatively low cost and in a simple manner.

My invention can be embodied in tires, or more properly tire casings, of various forms of which I have illustrated two in the drawings. It will be noted, however, from the following description and explanation that other modifications can be made and it will, therefore, be understood that by illustrating these two forms I do not intend to limit myself thereto.

Figure 2:
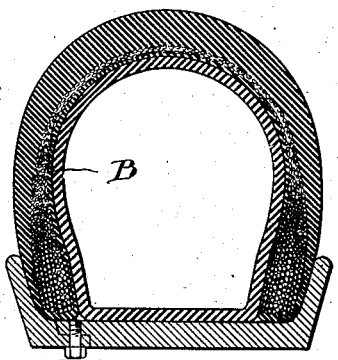
Figure 3:
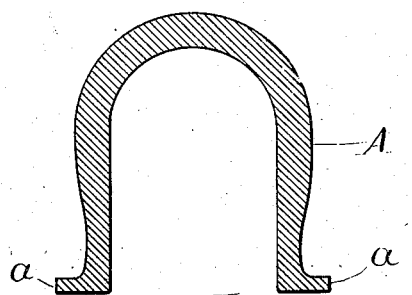

In the drawings referred to, Figure 1 is a side elevation of one form of my improved casing, a portion of the outer covering of rubber being removed to show the winding of the band forming the strengthening element thereof; Fig. 2 is a transverse section through the completed tire in the line 2—2 of Fig. 1; Fig. 3 is a transverse section through the mandrel which I prefer to use for forming the tire; Fig. 4 is a diagrammatic view showing the winding in detail; Fig. 5 is a similar diagrammatic view showing a second form of the casing, and Fig. 6 a detailed view on an enlarged scale showing the joining together of two parts of the band.

Referring to the drawings, A, is an annular mandrel, arch-shaped in cross-section and provided at its inner edge with laterally extending flanges, $a$. To permit this mandrel to be readily removed from the annular casing formed thereon the mandrel is made of three sections, $A^1$, $A^2$, $A^3$, the sections $A^2$, and $A^3$, being hinged to the section, $A^1$, and being arranged to meet in a diagonal line and be joined together. It will be obvious, by reference to Fig. 4 of the drawings, that when the complete tire casing is formed on the mandrel the mandrel can be readily removed by disconnecting the segments, $A^2$, and $A^3$, and folding the mandrel inward.

In the formation of my improved tire casing, the mandrel is expanded to form a complete annulus and its parts are locked together, as shown in Fig. 4, and usually covered with a thin layer of some very elastic woven or knitted fabric, B, such as stockinet, "frictioned" on the outer side, although this layer may be omitted if desired. After this layer has been placed upon the mandrel, I wind over it a plurality of circumferential turns of a comparatively non-elastic band, which, preferably, is first suitably rubber-covered to make it adherent. The method of winding this band will be best understood by referring to Fig. 4, where it will be seen that the first strand, C, of the band starts at a point, $c$, on the tread of the casing; that from the point, $c$, it extends to a point, $c^1$, on the inner or free edge of the casing which it strikes at a tangent; and that it extends thence, following as far as possible the same straight line to a second point, $c^2$, on the tread of the casing. In this way this strand, C, forms a chord of an arc, when viewed in side elevation, the chord being tangent to the circle of the free edge of the casing at its point of contact therewith and being in a plane at right angles to the face of the casing. The band, when it reaches the tread at $c^2$, is laid across the tread and from thence is carried forward to form the second strand, $C^1$, which is on the opposite side of the casing from the first strand and runs in a similar manner, *i. e.* in a straight line from the point, $c^2$, to the point, $c^4$, on the tread of the casing and tangent at the point, $c^3$, to the inner or free edge thereof. The band, when it again reaches the tread of the casing at $c^4$, is brought back across the tread to form the third strand, $C^2$, which is on the same side of the casing as the strand, C, and extends from the point, $c^4$, to the point, $c^6$, being tangent to the curve of the free edge at $c^5$. When the band reaches the tread of the casing at $c^6$, having meanwhile passed the inner edge thereof at a tangent it is again laid across the tread to form the fourth strand, $C^3$, which, like the strand, $C^1$, is on the rear side of the casing, as viewed in Fig. 4. This strand follows a course similar to that of the strand, $C^1$, and after passing the free edge of the casing on a tangent line, at $c^7$, reaches the tread of the tire at $c^8$, slightly in advance of the point of departure, $c$, of the first strand, C. The band is then laid across the tread to form a fifth strand, $C^4$, which lies in advance of the first strand, C, and crosses it very near its point of tangency to the free edge of the casing. The wrapping of the band is continued in the same way to form other strands, each one of which lies in advance of the corresponding strand immediately preceding it. It will be seen that by following this course of winding the entire surface of the inner layer, B, may be covered with a layer of strands, each one of which runs in opposite directions from a point on the free or inner edge of the casing to two points on the tread. It will be evident that the band may cross the tread of the casing more or less than four times in making a complete circuit thereof. The number of crossing points in a single circuit obviously depends upon the ratio between the cross-sectional diameter of the tire and the diameter of the wheel. Where the tire is comparatively small, like a bicycle tire, there are a number of crossing points, and as the cross-sectional diameter of the tire is increased in proportion to the diameter of the wheel the arcs subtended by the strands become greater and consequently the number of crossing points in a single circuit decreases. When it is wound continuously about the circumference of the casing (as illustrated in the drawings) the arcs subtended by the strands of each circuit should be such that in the winding of the successive circuits the crossing-points will be distributed in suitable succession about the circumference instead of lying one directly over the other. Obviously, however, each complete circuit might be formed from a short band or a plurality of short bands having their ends lapped or otherwise secured together as indicated in Fig. 6, in which reference characters $C^a$ and $C^b$ indicate the overlapped portions of two bands secured together to form a continuous band, and in that case, the spaces between the crossing-points should preferably be such as to form a complete and exact circuit ending at its starting point. In building tires, the winding thus explained can be continued indefinitely, one complete layer being wound over another until the requisite weight and strength are produced. For instance, the tire shown in Fig. 2 has two layers of strands on the tread; and this number may be increased as required. After the winding is completed, the usual outer protective layer of rubber may be placed in position. This can be done either before or after the casing is vulcanized.

It will be seen that as the band is carried about one complete circuit of the annular casing (as in forming the strands, C, $C^1$, $C^2$, $C^3$) it crosses the tread of the casing at a series of points (as the points, $c$, $c^2$, $c^4$, $c^6$, $c^8$); that it anchors together each two successive crossing-points (as the points, $c$—$c^2$, $c^2$—$c^4$, $c^4$—$c^6$, $c^6$—$c^8$); and that it also anchors each crossing-point on the tread to two tangent-points on the inner or free edge of the casing, each crossing-point in the tread being anchored to the two tangent-points between which it lies. Thus, for instance, the tread-point, $c^2$, is anchored by the strands, C, $C^1$, to the tangent-points, $c^1$, $c^3$, and each of the tread-points is similarly anchored by the corresponding strands to two tangent-points on the inner or free edge of the casing. Furthermore, while any given tread-point is anchored by the strands of one layer to two tangent-points lying on opposite sides of it (and on opposite sides or faces of the casing), the same tread-point is anchored by the strands of the next superposed layer to two other tangent-points on the free edges of the casing, and these points lie directly opposite the tangent-points to which the same tread-point is anchored by the strands of the first layer. That is to say, each tread-point is anchored by the strands of two successive layers to four tangent-points on the inner or free edges of the casing; and two of these tangent-points lie on one side or face of the casing and the other two on the other side or face thereof, the tread-point being at a center between the four tangent-points to which it is so anchored. The successive points on the tread being thus anchored together, the casing may be described as self-contained in point of resistance to radial strain; and since in practice each free edge of the casing is held immovably to the rim of the wheel, each point on the tread may be said to be anchored to four points on the wheel rim, the lines of connection running tangentially from said rim so as to transmit power to the tread in a theoretically perfect manner. In actual practice, the tire will fall short of perfect transmission only by the amount of elasticity inherent in the band and the amount of straightening of the band under stress due to the lateral curvature of the line it describes across the tread of the tire. It is, therefore, obviously desirable that the band be of some comparatively non-extensible material, as, for instance, linen, cotton, metal, or the like. If, however, any more elastic band is used, the invention will be equally present, although the actual embodiment will be less effective, for whatever be the character of the band, it obtains its greatest efficiency when arranged as here illustrated.

If the band be of fabric, such fabric may be of any desired sort, but preferably has no cross-threads, but only longitudinal ones, for cross-threads put kinks in the longitudinal-threads, and so give them the possibility of longitudinal stretch. While I prefer a fabric having only longitudinal threads, I do not intend to limit myself thereto for my invention consists rather in the arrangement of the band than in its physical characteristics. A woven fabric is undesirable in a tire, whatever its arrangement, by reason of the kinks in the threads and the resulting stretch and friction of the threads; but it will transmit power more effectively when wound as illustrated than in any other arrangement within my knowledge.

It will be seen that along the inner or free edges of the casing, the strands of the strengthening band are piled one upon the other so that the maximum thickness of the casing is along these edges. It will also be seen that as the width of the band is decreased, the number of turns necessary to cover the tread completely with a given number of layers will be increased, with a consequent increase of the number of layers on the inner or free edges of the casing. If the band is too much decreased in width, the number of layers on the free edges will become extremely great, causing a large and unnecessary increase of material along these edges. This accumulation of material on the extreme inner edges can be controlled by winding the band as illustrated in Fig. 5, where a wider band is used than is shown in Fig. 4, and each strand is lapped on the next preceding one on the tread to an amount equal, in the form illustrated, to half the width of the band. As an illustration of the effect of such winding upon the inner edge of the tire, let us assume that a band an inch wide wound as in Fig. 4 with the strands just touching each other on the tread would produce an inner edge one-half an inch thick. The free edges would then be one-half an inch thick, for the inside inch, and would then gradually taper off to the tread. If now instead of this band, a band two inches wide be used, and each strand be lapped half over the preceding one on the tread, as seen in Fig. 5, then the same amount of strain-resisting material will be incorporated in the tire with half the number of strands, but each strand will be twice the width required in the other form. As a result, the extreme inner edge will be but a quarter of an inch thick, but the inner two inches will have this thickness before beginning to taper off, instead of the inner inch. It will be seen that by following this method of lapping the bands and increasing their width proportionately the strain-resisting material can be spread through the side walls of the tire to any desired extent, thus preventing at will any undesirable accumulation of material along the inner or free edges.

It is well known by those skilled in the tire art that a single band of fabric, having longitudinal strands only is interchangeable in most positions with a series of parallel threads laid simultaneously so that when incorporated in the tire, they form, practically speaking, a single band and by the use of the term band in the specification and in the claims hereto appended I intend to cover any flat tape-like member of any material, or any collection of filaments of any material provided they are laid upon the tire side-by-side, so as to produce the same effect as if a unitary band had been laid.

If, as in the preferred form of construction, the fabric band is composed of a plurality of longitudinal threads held together only by the rubber of the band, it will be seen that the use of the band furnishes a peculiarly convenient means for distributing the strain-resisting threads or filaments of the band through the side walls of the casing. Other means for distributing the strain-resisting threads or filaments in a similar manner can readily be devised. One of the most important features of my present invention resides in the fact that the threads or filaments are distributed through a predetermined annular area at the inside edges of the casing, the threads or filaments of each strand of the band being tangent respectively to a series of circles outside of, and concentric with the inner edges of the casing, so as to procure the maximum strengthening and power-transmitting effect without an undue accumulation of material along the inner edges. A tire wound in the same general manner as that shown herein, but with the strands of the strengthening threads all running to the exact inner or free edges of the tire might be advantageous in some respects, but the inner edges would be so thick as to make the tire unwieldy (and comparatively impractical). In my tire the inner edges can be made of any desired thickness and the strengthening material can be distributed as desired through the side walls.

It will be evident to anyone skilled in the art of tire construction that when a flat band is wound upon a mandrel having a circular or partially circular cross-section, as herein illustrated, the band necessarily varies slightly from a single plane as it crosses the curved portion of the tire. For the sake of greater clearness, I have illustrated the tire in the drawings without this slight curvature and I have spoken in the claims of the bands as lying in a single plane. By this language I mean merely that they shall lie substantially in the same plane, it being understood that each strand will be laid to follow the curvature of the mandrel and its variation from a single plane in passing from a tread point to a tangent point will be determined by the curvature of the mandrel. Mandrels can be devised in which these portions of the strands will lie absolutely in the same plane, and others can be devised where there will be quite a variation from a single plane. This arrangement produces a very great strength upon the tire, for except for the lateral curve each portion of the winding connecting two tread points follows the shortest possible path along the surface of the tire and the distance between any two tread points can be increased only by causing a greater compression of the contents of the tire.

The advantages of my tire have been set forth to a considerable extent in describing its construction. Briefly, the structure is such that extremely efficient transmission of power between the rim of the wheel and the tire tread is obtained by reason of the strands lying at a direct tangent from each rigid point of the rim to the corresponding points on the tread of the tire. Furthermore, it secures great ease of transverse and lateral movement of the filament-strands and consequent maximum cushioning quality and resiliency.

It will be seen that since the band can be wound upon the tire with mathematical accuracy, the structure lends itself particularly to automatic machine manufacture, and thus minimizes the ever-present danger of defects due to careless and inefficient hand-labor.

In the foregoing description of my improved tire-casing and in the claims appended hereto, I have described the bands as tangent to the free edges of the casing. In fact, the bands are tangent to circles parallel to the free edges of the casing; and these circles are preferably so near said edges as to be practically coincident therewith, as shown in the drawings. The distance between these circles of tangency, and the extreme inner or free edges of the casing might be somewhat varied as compared with the illustrated constructions; and the construction would still be within the intended meaning of the description in question.

I claim as new and desire to secure by Letters Patent:

1. A tire casing open on the rim side and containing a strain-resisting band wound circumferentially about the casing for at least one turn and crossing the tread thereof at intervals, said band touching at a tangent the inner or free edges of the casing in the intervals between its crossing points on the tread.

2. A tire casing open on the rim side and containing a strain-resisting band composed of a plurality of parallel strands, one edge of the band being arranged at a tangent to one of the inner or free edges of the casing and extending thence across the tread where the opposite edge of the band is tangent to the inner or free edge on that side of the casing.

3. A tire casing open on the rim side and embodying a strain-resisting band tangentially disposed to the free edges thereof.

4. A tire casing open on the rim side and embodying a plurality of turns of a strain-resisting band which crosses the tread at intervals and touches the inner or free edges of the casing at a tangent between its crossing points on the tread, the crossing points being so disposed that the succeeding turns of the band are lapped upon each other on the tread whereby the thickness of the inner edges is decreased as compared with the thickness of the tread.

5. A tire casing open on the rim side and embodying a series of substantially parallel strain-resisting filaments, the strands of which connect separate tread points, the central portions of said filament-strands intermediate of the connected tread points being distributed according to a pre-arranged scheme throughout a predetermined annular space along the inner or free edges of the casing.

6. A tire casing open on the rim side and embodying a plurality of strands of strain-resisting filament which connect separate tread points, said strands being tangent intermediate of the connected tread points to a series of circles concentric with the edges of the tire casing and distributed throughout a predetermined annular band.

In witness whereof I have signed the above application for Letters Patent at Chicago, in the county of Cook and State of Illinois, this 10th day of October, A. D. 1905.

JOHN F. PALMER.

Witnesses:
  CHAS. O. SHERVEY,
  K. M. CORNWALL.